(12) United States Patent
Akamatsu et al.

(10) Patent No.: US 12,037,522 B2
(45) Date of Patent: Jul. 16, 2024

(54) ELECTRICAL DEBONDING TYPE ADHESIVE SHEET, JOINED BODY, AND DEBONDING METHOD FOR JOINED BODY

(71) Applicant: NITTO DENKO CORPORATION, Ibaraki (JP)

(72) Inventors: Kaori Akamatsu, Ibaraki (JP); Kaori Mizobata, Ibaraki (JP); Ryo Awane, Ibaraki (JP); Akira Hirao, Ibaraki (JP); Junji Yokoyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 70 days.

(21) Appl. No.: 16/978,246

(22) PCT Filed: Mar. 6, 2019

(86) PCT No.: PCT/JP2019/008819
§ 371 (c)(1),
(2) Date: Sep. 4, 2020

(87) PCT Pub. No.: WO2019/172303
PCT Pub. Date: Sep. 12, 2019

(65) Prior Publication Data
US 2021/0002516 A1    Jan. 7, 2021

(30) Foreign Application Priority Data
Mar. 8, 2018  (JP) ................. 2018-042244

(51) Int. Cl.
*C09J 7/26* (2018.01)
*B32B 43/00* (2006.01)
*C09J 7/38* (2018.01)
(52) U.S. Cl.
CPC ............. *C09J 7/26* (2018.01); *B32B 43/003* (2013.01); *C09J 7/38* (2018.01)

(58) Field of Classification Search
CPC ..................... C08K 2201/001; B32B 38/0004
See application file for complete search history.

(56) References Cited

U.S. PATENT DOCUMENTS 7,054,161 B1* 5/2006 James ................. H01L 24/32
361/720
7,332,218 B1 2/2008 Gilbert
(Continued)

FOREIGN PATENT DOCUMENTS

CN      1255037 A   5/2000
CN    101937790 A   1/2011
(Continued)

OTHER PUBLICATIONS

Extended European Search Report issued on Nov. 25, 2021, for corresponding European Patent Application No. 19764917.1.
(Continued)

*Primary Examiner* — George R Koch
*Assistant Examiner* — Christopher C Caillouet
(74) *Attorney, Agent, or Firm* — Hauptman Ham, LLP

(57) ABSTRACT

An object of a first embodiment of the present invention is to provide an electrical debonding type adhesive sheet which can be applied while inhibiting the trapping of air bubbles and while easily avoiding surface irregularities, etc., and which gives a joined body that can be easily debonded. The electrical debonding type adhesive sheet according to the first embodiment of the present invention includes a substrate for voltage application, a first adhesive layer, which is constituted of an electrically debondable adhesive and is formed on an electroconductive surface of the substrate for voltage application, and a second adhesive layer, which is formed on the opposite surface of the substrate for voltage application, the electrical debonding type adhesive sheet (Continued)

including a plurality of linked parts and a linking part which links the plurality of linked parts to each other.

10 Claims, 11 Drawing Sheets

(56) References Cited

U.S. PATENT DOCUMENTS

| | | | |
|---|---|---|---|
| 2001/0031367 | A1 | 10/2001 | Gilbert |
| 2006/0083901 | A1 | 4/2006 | Cho |
| 2008/0186751 | A1* | 8/2008 | Tokuyama ............ H02M 7/537 |
| | | | 363/131 |
| 2008/0196828 | A1 | 8/2008 | Gilbert |
| 2008/0283415 | A1 | 11/2008 | Gilbert |
| 2010/0000878 | A1 | 1/2010 | Gilbert |
| 2012/0214010 | A1* | 8/2012 | Kagimoto ............... H01L 24/92 |
| | | | 228/249 |
| 2016/0009960 | A1 | 1/2016 | Yamada et al. |
| 2016/0009961 | A1 | 1/2016 | Yamada et al. |
| 2016/0009962 | A1 | 1/2016 | Yamada et al. |
| 2016/0029826 | A1 | 2/2016 | Bongiovanni et al. |
| 2018/0265750 | A1 | 9/2018 | Akamatsu et al. |
| 2018/0305593 | A1 | 10/2018 | Akamatsu et al. |
| 2019/0031929 | A1 | 1/2019 | Akamatsu et al. |

FOREIGN PATENT DOCUMENTS

| | | |
|---|---|---|
| CN | 104449046 A | 3/2015 |
| CN | 105073938 A | 11/2015 |
| CN | 105143385 A | 12/2015 |
| EP | 3363873 A1 | 8/2018 |
| EP | 3363875 A1 | 8/2018 |
| JP | S58-15638 U | 1/1983 |
| JP | H7-18818 A | 1/1995 |
| JP | 2000-225900 A | 8/2000 |
| JP | 2003-129030 A | 5/2003 |
| JP | 2004-37741 A | 2/2004 |
| JP | 2006-113582 A | 4/2006 |
| JP | 3141272 U | 5/2008 |
| JP | 2011-52056 A | 3/2011 |
| JP | 2012-123231 A | 6/2012 |
| JP | 2014-141072 A | 8/2014 |
| JP | 2014-189672 A | 10/2014 |
| JP | 2015-210963 A | 11/2015 |
| WO | 01/05584 A1 | 1/2001 |
| WO | 2014/157408 A1 | 10/2014 |
| WO | 2017/064918 A1 | 4/2017 |
| WO | 2017/064925 A1 | 4/2017 |

OTHER PUBLICATIONS

International Search Report issued for corresponding International Patent Application No. PCT/JP2019/008819 on May 14, 2019, along with an English translation.
Written Opinion issued for corresponding International Patent Application No. PCT/JP2019/008819 on May 14, 2019.
Office Action issued on Apr. 5, 2022 for corresponding Japanese Patent Application No. 2018-042244, along with an English machine translation.
Office Action issued on May 25, 2022, for corresponding Chinese patent application No. 201980016707.2, along with an English translation.
Office Action issued on Sep. 13, 2022 for corresponding Japanese Patent Application No. 2018-042244, along with an English machine translation (6 pages).
Office Action issued on Nov. 25, 2022 for corresponding Chinese Patent Application No. 201980016707.2, along with an English translation (11 pages).
Office Action issued on Dec. 5, 2023 for corresponding Japanese Patent Application No. 2022-208627, along with an English machine translation (5 pages).
Office Action issued on Apr. 23, 2024 for corresponding Japanese Patent Application No. 2022-208627, along with an English machine translation (7 pages).

* cited by examiner (a)

(b)

(a)

(b)

(a)

(b)

ELECTRICAL DEBONDING TYPE ADHESIVE SHEET, JOINED BODY, AND DEBONDING METHOD FOR JOINED BODY

CROSS REFERENCE TO RELATED APPLICATION

This present application is a national stage filing under 35 U.S.C § 371 of PCT application number PCT/JP2019/008819 filed on Mar. 6, 2019, which designates the United States and was published in Japan, and which claims priority to Japanese Patent Application No. 2018-042244 filed on Mar. 8, 2018 in the Japanese Patent Office. The disclosures of the above-listed applications are hereby incorporated by reference herein in their entireties.

TECHNICAL FIELD

The present invention relates to an electrical debonding type adhesive sheet including an adhesive layer formed from en electrically debondable adhesive composition, a joined body including the adhesive sheet and adherends, and a debonding method for the joined body.

BACKGROUND ART

There are growing demands regarding, for example, reworking for improving yield in electronic-component production steps, etc. and recycling for disassembling and recovering components after use. In order to meet such demands, a double-sided adhesive sheet having certain adhesive force and certain debonding properties is sometimes utilized for joining members in electronic-component manufacturing steps, etc.

Known as a double-sided adhesive sheet combining adhesive force and debonding properties is an adhesive sheet (electrical debonding type adhesive sheet) which includes an electrical debonding type adhesive layer constituted of an electrically debondable adhesive composition and which undergoes debonding upon voltage application to the adhesive layer (Patent Document 1).

CITATION LIST

Patent Literature

Patent Document 1: International Publication WO 2017/064925

SUMMARY OF THE INVENTION

Technical Problems

In the case where adherends to be joined have a large size, an adhesive sheet having an increased area according to the size of the adherends may be used but this poses the following problems.

First, due to the increased area of the adhesive sheet, air bubbles are prone to be trapped between each adherend and the adhesive sheet. The trapping of air bubbles is undesirable because the trapping results in a decrease in the area of contact between the adhesive sheet and each adherend and hence in a decrease in adhesive force between each adherend and the adhesive sheet.

In cases when one of the adherends is, for example, an electronic substrate, the electronic substrate sometimes has surface irregularities due to various elements, etc., and it is necessary to apply an adhesive sheet to the adherend while avoiding such irregularities. It is, however, difficult to avoid the irregularities if the adhesive sheet has a large area.

It is thought that use of a plurality of adhesive sheets in joining such adherends is effective in overcoming that problem. This not only can avoid the trapping of air bubbles due to the use of an adhesive sheet having an increased area but also enables the adhesive sheets to be disposed so as to avoid the surface irregularities. This method, however, has a drawback in that since it is necessary that a voltage should be applied to the electrical debonding type adhesive layer of each adhesive sheet in debonding, the number of steps increases, resulting in a decrease in operation efficiency.

It has hence been required, in joining adherends with an electrical debonding type adhesive sheet, to simultaneously attain inhibition of the trapping of air bubbles, ease of avoiding surface irregularities, etc., and inhibition of a decrease in operation efficiency due to an increase in the number of steps for debonding.

Solution to the Problems

The present inventors diligently made investigations and, as a result, have discovered that those problems can be overcome with an electrical debonding type adhesive sheet and a joined body which have specific configurations. The inventors have further discovered that those problems can be overcome also with a specific debonding method.

Specifically, an electrical debonding type adhesive sheet according to a first embodiment of the present invention includes a substrate for voltage application in which at least one surface has electrical conductivity, a first adhesive layer, which is constituted of an electrically debondable adhesive and is formed on the electroconductive surface of the substrate for voltage application, and a second adhesive layer, which is formed on that surface of the substrate for voltage application which is on the reverse side from the first adhesive layer, the electrical debonding type adhesive sheet including a plurality of linked parts and a linking part which links the plurality of linked parts to each other.

In one mode of the first embodiment of the present invention, the electrical debonding type adhesive sheet may have a comb shape.

A joined body according to the first embodiment of the present invention includes the electrical debonding type adhesive sheet according to the first embodiment of the present invention, a first adherend, which is adhered to the first adhesive layer, and a second adherend, which is adhered to the second adhesive layer, wherein the first adherend is electroconductive.

A joined body according to a second embodiment of the present invention is a joined body including a first adherend, a second adherend, and a plurality of electrical debonding type adhesive sheets by which the first and second adherends are joined to each other, wherein the electrical debonding type adhesive sheets each include an electroconductive substrate, a first adhesive layer, which is constituted of an electrically debondable adhesive and is formed on one surface of the electroconductive substrate, and a second adhesive layer, which is formed on that surface of the electroconductive substrate which is on the reverse side from the first adhesive layer, the first adherend is electroconductive and is adhered to the first adhesive layers, the second adherend is adhered to the second adhesive layers, and the electroconductive substrates of the plurality of electrical debonding type adhesive sheets are electrically connected to each other by a linking member.

A joined body according to a third embodiment of the present invention is a joined body including a first adherend, a second adherend, and a plurality of electrical debonding type adhesive sheets by which the first and second adherends are joined to each other, wherein the electrical debonding type adhesive sheets include an electrically debondable adhesive, the first adherend is adhered to one surface of each of the electrical debonding type adhesive sheets, the second adherend is adhered to that surface of each of the electrical debonding type adhesive sheets which is on the reverse side from the first adherend, and the first adherend and the second adherend are electroconductive.

A joined body according to a fourth embodiment of the present invention is a joined body including a first adherend, a second adherend, and a plurality of electrical debonding type adhesive sheets by which the first and second adherends are joined to each other, wherein the electrical debonding type adhesive sheets each include an electroconductive substrate, a first adhesive layer, which is constituted of an electrically debondable adhesive and is formed on the electroconductive substrate, and a second adhesive layer, which is constituted of an electroconductive adhesive and is formed on that surface of the electroconductive substrate which is on the reverse side from the first adhesive layer, the first adhesive layers of the plurality of electrical debonding type adhesive sheets each are adhered to the first adherend, and the second adhesive layers each are adhered to the second adherend, the first adherend is electroconductive, the second adherend includes an electroconductive portion having electrical conductivity, and the second adhesive layers of the plurality of electrical debonding type adhesive sheets are electrically connected to each other by the electroconductive portion.

A joined-body debonding method according to a fifth embodiment of the present invention is a debonding method for a joined body including a first adherend, a second adherend, and a plurality of electrical debonding type adhesive sheets by which the first and second adherends are joined to each other, wherein the electrical debonding type adhesive sheets each include a substrate for voltage application in which at least one surface has electrical conductivity, a first adhesive layer, which is constituted of an electrically debondable adhesive and is formed on the electroconductive surface of the substrate for voltage application, and a second adhesive layer, which is formed on that surface of the substrate for voltage application which is on the reverse side from the first adhesive layer, the first adherend is electroconductive and is adhered to the first adhesive layers, and the second adherend is adhered to the second adhesive layers, the debonding method including electrically connecting the substrates for voltage application of the plurality of electrical debonding type adhesive sheets by a jig and debonding the first adherend and the second adherend while simultaneously applying a voltage to the first adhesive layers of the plurality of electrical debonding type adhesive sheets.

Advantageous Effects of the Invention

The electrical debonding type adhesive sheet according to the first embodiment of the present invention can be applied to adherends while inhibiting air bubbles from being trapped and while easily avoiding surface irregularities, etc.

The joined body according to the first embodiment of the present invention is excellent in terms of the efficiency of debonding.

The joined bodies according to the second to fourth embodiments of the present invention, although each being a joined body in which adherends are joined to each other by a plurality of electrical debonding type adhesive sheets, are excellent in terms of the efficiency of debonding.

By the joined-body debonding method according to the fifth embodiment of the present invention, a joined body in which adherends are joined to each other by a plurality of electrical debonding type adhesive sheets can be efficiently debonded.

DESCRIPTION OF EMBODIMENTS

Modes for carrying out the present invention are explained in detail below. However, the present invention is not limited to the embodiments described below.

First Embodiment

<Adhesive Sheet>

Figure 1:
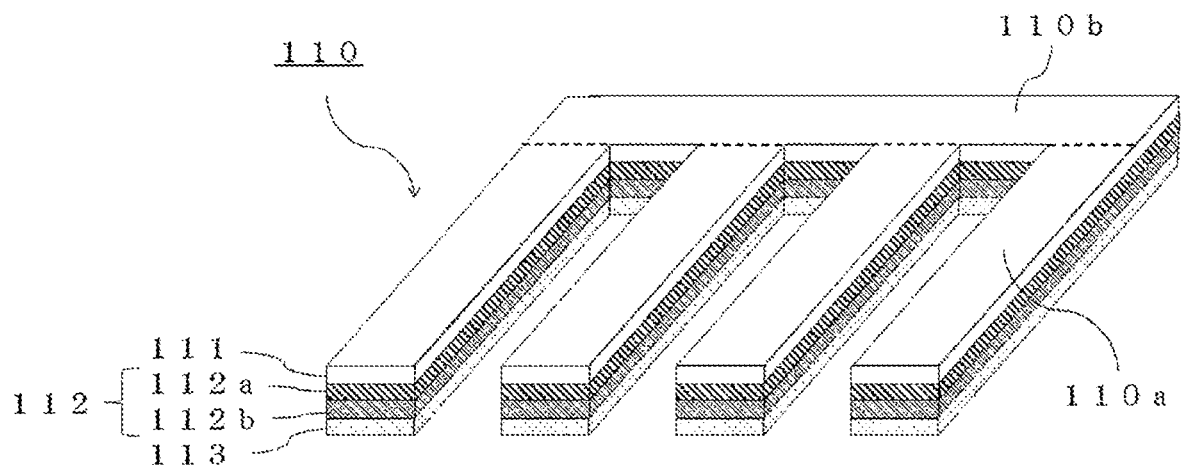
FIG. 1 is a slant view of an electrical debonding type adhesive sheet according to the first embodiment of the present invention.

FIG. 1 is a diagrammatic view of an electrical debonding type adhesive sheet 110 according to the first embodiment of the present invention (hereinafter also referred to simply as "adhesive sheet 110 according to this embodiment" or "adhesive sheet 110"). The adhesive sheet 110 according to this embodiment is an electrical debonding type adhesive sheet including a substrate for voltage application 112 in which at least one surface has electrical conductivity, a first adhesive layer 111, which is constituted of an electrically debondable adhesive and is formed on the electroconductive surface of the substrate for voltage application 112, and a second adhesive layer 113, which is formed on that surface of the substrate for voltage application 112 which is on the reverse side from the first adhesive layer 111, the electrical debonding type adhesive sheet including a plurality of linked parts 110*a* and a linking part 110*b* which links the plurality of linked parts 110*a* to each other.

(Constituent Elements of the Adhesive Sheet)

First, the layers, linked parts, and linking part which constitute the adhesive sheet 110 according to this embodiment are explained.

The first adhesive layer 111 is an adhesive layer constituted of an electrically debondable adhesive and includes both a polymer as an adhesive and an electrolyte.

Examples of the polymer included in the first adhesive layer 111 include acrylic polymers, rubber-based polymers, vinyl-alkyl-ether-based polymers, silicone-based polymers, polyester-based polymers, polyamide-based polymers, urethane-based polymers, fluoropolymers, and epoxy-based polymers. The first adhesive layer 111 may include one polymer as the only polymer or may include two or more polymers.

From the standpoints of inhibiting cost increase and attaining high production efficiency, it is preferable that the first adhesive layer 111 includes an acrylic polymer. An acrylic polymer is a polymer which includes monomer units derived from an alkyl acrylate and/or an alkyl methacrylate, as main monomer units contained in a largest amount in terms of mass proportion. Hereinafter, "(meth)acrylic" represents "acrylic" and/or "methacrylic".

In the case where the first adhesive layer 111 includes an acrylic polymer, it is preferable that the acrylic polymer includes monomer units derived from an alkyl (meth)acrylate in which the alkyl has 1-14 carbon atoms. Examples of the alkyl (meth)acrylate include methyl (meth)acrylate, ethyl (meth)acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth)acrylate, hexyl (meth)acrylate, 2-ethylbutyl (meth)acrylate, heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Preferred of these are n-butyl (meth)acrylate, sec-butyl (meth)acrylate, n-octyl (meth)acrylate, isooctyl (meth)acrylate, 2-ethylhexyl (meth)acrylate, n-nonyl (meth)acrylate, and isononyl (meth)acrylate. One alkyl (meth)acrylate may be used, or two or more alkyl (meth)acrylates may be used.

In the acrylic polymer, the proportion of the monomer units derived from an alkyl (meth)acrylate in which the alkyl group has 1-14 carbon atoms is preferably 50% by mass or higher, more preferably 60% by mass or higher, still more preferably 70% by mass or higher, yet still more preferably 80% by mass or higher, from the standpoint of enabling the first adhesive layer 111 to have high adhesive force. That is, the proportion of the alkyl (meth)acrylate in which the alkyl group has 1-14 carbon atoms to the sum of the starting-material monomers for forming the acrylic polymer is preferably 50% by mass or higher, more preferably 60% by mass or higher, still more preferably 70% by mass or higher, yet still more preferably 80% by mass or higher, from the standpoint of enabling the first adhesive layer 111 to have high adhesive force.

In the case where the first adhesive layer 111 includes an acrylic polymer, it is preferable that the acrylic polymer contains monomer units derived from a monomer containing a polar group, from the standpoint of enabling the first adhesive layer 111 to have high adhesive force. Examples of the monomer containing a polar group include carboxyl-group-containing monomers, hydroxyl-group-containing monomers, and vinyl-group-containing monomers.

Examples of the carboxyl-group-containing monomers include acrylic acid, methacrylic acid, itaconic acid, maleic acid, fumaric acid, crotonic acid, isocrotonic acid, carboxyethyl (meth)acrylate, and carboxypentyl (meth)acrylate. Preferred of these are acrylic acid and methacrylic acid. One carboxyl-group-containing monomer may be used, or two or more carboxyl-group-containing monomers may be used.

Examples of the hydroxyl-group-containing monomers include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutyl vinyl ether, and diethylene glycol monovinyl ether. Preferred of these is 2-hydroxyethyl (meth)acrylate. One hydroxyl-group-containing monomer may be used, or two or more hydroxyl-group-containing monomers may be used.

Examples of the vinyl-group-containing monomers include vinyl acetate, vinyl propionate, and vinyl laurate. Preferred of these is vinyl acetate. One vinyl-group-containing monomer may be used, or two or more vinyl-group-containing monomers may be used.

In the acrylic polymer, the proportion of the monomer units derived from a monomer containing a polar group is preferably 0.1% by mass or higher from the standpoint of enabling the first adhesive layer 111 to retain cohesive force and thereby preventing the first adhesive layer 111 from causing an adhesive transfer to the debonded adherend surface. That is, the proportion of the monomer containing a polar group to the sum of the starting-material monomers for constituting the acrylic polymer is preferably 0.1% by mass or higher from the standpoints of ensuring cohesive force and preventing the occurrence of an adhesive transfer. Meanwhile, from the standpoint of causing the acrylic polymer to properly exhibit properties attributable to the monomer units derived from the alkyl (meth)acrylate, in which the alkyl group has 1-14 carbon atoms, the proportion of the monomer units derived from a monomer containing a polar group in the acrylic polymer is preferably 30% by mass or less. That is, the proportion of the monomer containing a polar group to the sum of the starting-material monomers for constituting the acrylic polymer is preferably 30% by mass or less from the standpoint of causing the acrylic polymer to exhibit the properties.

Methods for polymerizing such monomers to obtain the acrylic polymer are not particularly limited, and known methods can be used. Examples of polymerization techniques include solution polymerization, emulsion polymerization, bulk polymerization, and suspension polymerization.

The content of the polymer in the first adhesive layer 111 is preferably 70% by mass or higher, more preferably 80% by mass or higher, still more preferably 85% by mass or higher, yet still more preferably 90% by mass or higher, from the standpoint of enabling the first adhesive layer 111 to have sufficient adhesive force.

The electrolyte contained in the first adhesive layer 111 is a substance capable of being ionized into one or more anions and one or more cations. Examples of the electrolyte include ionic liquids, alkali metal salts, and alkaline-earth metal salts. The electrolyte contained in the first adhesive layer 111 is preferably an ionic liquid from the standpoint of enabling the first adhesive layer 111 to have satisfactory electrically debonding properties. The ionic liquid is a salt which is liquid at room temperature (about 25° C.), and includes an anion and a cation.

In the case where the first adhesive layer 111 contains an ionic liquid, it is preferable that this ionic liquid includes one or more anions which are at least one anion selected from the group consisting of $(FSO_2)_2N^-$, $(CF_3SO_2)_2N^-$, $(CF_3CF_2SO_2)_2N^-$, $(CF_3SO_2)_3C^-$, $Br^-$, $AlCl_4^-$, $Al_2Cl_7^-$, $NO_3^-$, $BF_4^-$, $PF_6^-$, $CH_3COO^-$, $CF_3COO^-$, $CF_3CF_2CF_2COO^-$, $CF_3SO_3^-$, $CF_3(CF_2)_3SO_3^-$, $AsF_6^-$, $SbF_6^-$, and $F(HF)_n^-$. Preferred of these anions are $(FSO_2)_2N^-$ [bis(fluorosulfonyl)imide anion] and $(CF_3SO_2)_2N^-$ [bis(trifluoromethanesulfonyl)imide anion], because these anions are chemically stable and are suitable for attaining the electrically debonding properties of the first adhesive layer 111.

In the case where the first adhesive layer 111 contains an ionic liquid, it is preferable that this ionic liquid includes one or more cations which are at least one cation selected from the group consisting of imidazolium cations, pyridinium cations, pyrrolidinium cations, and ammonium cations.

Examples of the imidazolium cations include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-hexyl-3-methylimidazolium cation, 1-heptyl-3-methylimidazolium cation, 1-octyl-3-methylimidazolium cation, 1-nonyl-3-methylimidazolium cation, 1-undecyl-3-methylimidazolium cation, 1-dodecyl-3-methylimidazolium cation, 1-tridecyl-3-methylimidazolium cation, 1-tetradecyl-3-methylimidazolium cation, 1-pentadecyl-3-methylimidazolium cation, 1-hexadecyl-3-methylimidazolium cation, 1-heptadecyl-3-methylimidazolium cation, 1-octadecyl-3-methylimidazolium cation, 1-undecyl-3-methylimidazolium cation, 1-benzyl-3-methylimidazolium cation, 1-butyl-2,3-dimethylimidazolium cation, and 1,3-bis(dodecyl)imidazolium cation.

Examples of the pyridinium cations include 1-butylpyridinium cation, 1-hexylpyridinium cation, 1-butyl-3-methylpyridinium cation, 1-butyl-4-methylpyridinium cation, and 1-octyl-4-methylpyridinium cation.

Examples of the pyrrolidinium cations include 1-ethyl-1-methylpyrrolidinium cation and 1-butyl-1-methylpyrrolidinium cation.

Examples of the ammonium cations include tetraethylammonium cation, tetrabutylammonium cation, methyltrioctylammonium cation, tetradecyltrihexylammonium cation, glycidyltrimethylammonium cation, and trimethylaminoethyl acrylate cation.

Especially preferred as the ionic liquid in the first adhesive layer 111 is an ionic liquid including both $(FSO_2)_2N^-$ [bis(fluorosulfonyl)imide anion] and a cation having a molecular weight of 160 or less, from the standpoint of utilizing the high diffusibility of the cations to impart high electrically debonding properties to the first adhesive layer 111. Examples of the cation having a molecular weight of 160 or less include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-butylpyridinium cation, 1-hexylpyridinium cation, 1-butyl-3-methylpyridinium cation, 1-butyl-4-methylpyridinium cation, 1-ethyl-1-methylpyrrolidinium cation, 1-butyl-1-methylpyrrolidinium cation, tetraethylammonium cation, glycidyltrimethylammonium cation, and trimethylaminoethyl acrylate cation.

Examples of commercial products of ionic liquids which can be contained in the first adhesive layer 111 include "ELEXCEL AS-110", "ELEXCEL MP-442", "ELEXCEL IL-210", "ELEXCEL MP-471", "ELEXCEL MP-456", and "ELEXCEL AS-804", all manufactured by Dai-ichi Kogyo Seiyaku Co., Ltd.

Examples of the alkali metal salts include LiCl, $Li_2SO_4$, $LiBF_4$, $LiPF_6$, $LiClO_4$, $LiAsF_6$, $LiCF_3SO_3$, $LiN(SO_2CF_3)_2$, $LiN(SO_2C_2F_5)_2$, $LiC(SO_2CF_3)_3$, NaCl, $Na_2SO_4$, $NaBF_4$, $NaPF_6$, $NaClO_4$, $NaAsF_6$, $NaCF_3SO_3$, $NaN(SO_2CF_3)_2$, $NaN(SO_2C_2F_5)_2$, $NaC(SO_2CF_3)_3$, KCl, $K_2SO_4$, $KBF_4$, $KPF_6$, $KClO_4$, $KAsF_6$, $KCF_3SO_3$, $KN(SO_2CF_3)_2$, $KN(SO_2C_2F_5)_2$, and $KC(SO_2CF_3)_3$.

The content of an ionic liquid in the first adhesive layer 111 per 100 parts by mass of the polymer in the first adhesive layer 111 is, for example, 0.1 part by mass or higher from the standpoint of imparting electrically debonding properties to the first adhesive layer 111. From the standpoint of attaining better electrically debonding properties, the content of the ionic liquid is preferably 0.5 parts by mass or higher, more preferably 0.6 parts by mass or higher, still more preferably 0.8 parts by mass or higher, especially preferably 1.0 part by mass or higher, most preferably 1.5 parts by mass or higher. From the standpoint of enabling the first adhesive layer 111 to attain a satisfactory balance between satisfactory adhesive force and electrically debonding properties, the content of the ionic liquid in the first adhesive layer 111, per 100 parts by mass of the polymer in the first adhesive layer 111, is preferably 30 parts by mass or less, more preferably 20 parts by mass or less, still more preferably 15 parts by mass or less, especially preferably 10 parts by mass or less, most preferably 5 parts by mass or less.

The first adhesive layer 111 may contain other ingredients so long as the inclusion thereof does not lessen the effects of the present invention. Examples of the ingredients include tackifiers, silane coupling agents, colorants, pigments, dyes, surface lubricants, leveling agents, softeners, antioxidants, aging inhibitors, light stabilizers, polymerization inhibitors, inorganic or organic fillers, metal powders, particulate substances, and flaky substances. The content of such ingredients may be determined in accordance with intended uses so long as the effects of the present invention are not lessened. For example, the content thereof is 10 parts by mass or less per 100 parts by mass of the polymer.

The thickness of the first adhesive layer 111 is not particularly limited. However, from the standpoint of enabling the first adhesive layer 111 to have satisfactory adhesiveness, the thickness thereof is preferably 1 μm or larger, more preferably 3 μm or larger, still more preferably 5 μm or larger, especially preferably 8 μm or larger. Meanwhile, from the standpoint of attaining a reduction in the voltage to be applied in adherend debonding, the thickness of the first adhesive layer 111 is preferably 1,000 μm or less, more preferably 500 μm or less, still more preferably 100 μm or less, especially preferably 30 μm or less.

The second adhesive layer 113 includes a polymer for causing the second adhesive layer 113 to exhibit adhesiveness. Ingredients which can be included in the second adhesive layer 113 and the contents thereof, except for electrolytes, are the same as the ingredients which can be included in the first adhesive layer 111 and the contents thereof, which were described above.

The thickness of the second adhesive layer 113 is not particularly limited. However, from the standpoint of enabling the second adhesive layer 113 to have satisfactory adhesiveness, the thickness thereof is preferably 1 μm or larger, more preferably 3 μm or larger, still more preferably 5 μm or larger, especially preferably 8 μm or larger. Meanwhile, the thickness of the second adhesive layer 113 is preferably 1,000 μm or less, more preferably 500 μm or less, still more preferably 100 μm or less.

The substrate for voltage application 112 is not particularly limited so long as at least one surface thereof has electrical conductivity. For example, the substrate for voltage application 112 may have a multilayer structure including an electroconductive layer 112a and a base layer 112b, as shown in FIG. 1, or may have a single-layer structure constituted of a metal foil, etc.

The thickness of the substrate for voltage application 112 is not particularly limited. However, the thickness thereof is preferably 10 μm or larger, more preferably 12 μm or larger, still more preferably 25 μm or larger. Meanwhile, the thickness thereof is preferably 1,000 μm or less, more preferably 500 μm or less, still more preferably 300 μm or less, especially preferably 100 μm or less.

In the case where the substrate for voltage application 112 has a multilayer structure including an electroconductive layer 112a and a base layer 112b, the base layer 112b is a portion functioning as a support. Examples thereof include plastic bases, fibrous bases, paper bases, and laminates of these. The base layer 112b may have a single-layer structure or may be composed of two or more layers. The base layer 112b may have undergone any of various treatments including a back-surface treatment, antistatic treatment, and priming, according to need.

The thickness of the base layer 112b is not particularly limited. However, the thickness thereof is preferably 10 μm or larger, more preferably 12 μm or larger, still more preferably 25 μm or larger. Meanwhile, the thickness of the base layer 112b is preferably 1,000 μm or less, more preferably 500 μm or less, still more preferably 300 μm or less, especially preferably 100 μm or less.

The electroconductive layer 112a is a layer having electrical conductivity and is constituted of, for example, a metal or an electroconductive polymer. Such electroconductive layer 112a can be formed by plating, chemical vapor deposition, sputtering, etc.

The thickness of the electroconductive layer 112a is not particularly limited. However, the thickness thereof is preferably 0.001 μm or larger, more preferably 0.01 μm or larger, still more preferably 0.03 μm or larger, especially preferably 0.05 μm or larger. Meanwhile, the thickness of the electroconductive layer 112a is preferably 1,000 μm or less, more preferably 500 μm or less, still more preferably 300 μm or less, especially preferably 50 μm or less, most preferably 10 μm or less.

The adhesive sheet 110 according to this embodiment includes a plurality of linked parts 110a. The linked parts 110a are not particularly limited in the size and shape thereof, and may differ from each other in size or shape or be equal in size and shape. The number of the linked parts 110a also is not particularly limited.

The plurality of linked parts 110a are linked to each other by one or more linking parts 110b. The linking parts 110b also are not particularly limited in the size and shape thereof, and may differ from each other in size or shape or be equal in size and shape. The number thereof also is not particularly limited. In the adhesive sheet 110 according to this embodiment, each of the linked parts 110a is linked to at least one other linked part 110a by the linking part(s) 110b.

The adhesive sheet 110 according to this embodiment, which has the configuration described above, has a feature wherein the area of the linked parts 110a and linking part 110b is small as compared with plain adhesive sheets and, hence, the trapping of air bubbles during application can be inhibited. Furthermore, since there are spaces between the plurality of linked parts 110a, adherends can be joined so that surface irregularities and the like of the adherends lie in those spaces.

Moreover, since the adhesive sheet 110 according to this embodiment has a small area as compared with plain adhesive sheets, this adhesive sheet 110 is preferred from the standpoint of cost reduction.

Separators (release liners) may be disposed on the surfaces of the first adhesive layer 111 and second adhesive layer 113 of the adhesive sheet 110 according to this embodiment. The separators are an element for protecting the first adhesive layer 111 and second adhesive layer 113 of the adhesive sheet 110 from exposure, and are peeled from the adhesive sheet 110 when the adhesive sheet 110 is applied to adherends. The adhesive sheet 110 may be in a form in which the adhesive sheet 110 is in the state of being sandwiched between two separators, or may be in a form obtained by winding the adhesive sheet 110 and a separator into a roll so that layers of the adhesive sheet 110 alternate with layers of the separator. Examples of the separator include bases having a releasing layer, lowly bondable bases constituted of a fluoropolymer, and lowly bondable bases constituted of a nonpolar polymer. The surface of the separator may have undergone a release treatment, antifouling treatment, or antistatic treatment. The thickness of the separator is, for example, 5-200 μm.

(Adhesive Force of the Adhesive Sheet)

It is preferable that the adhesive surfaces of the adhesive sheet 110, that is, the surface on the first adhesive layer 111 side and the surface on the second adhesive layer 113 side, have a 180° peel adhesive force (application to SUS304 plate; pulling speed, 300 mm/min; peeling temperature, 23° C.) of 0.1 N/10 mm or higher, from the standpoint of attaining satisfactory adhesive force. The 180° peel adhesive force of the adhesive sheet 110 can be measured, for example, in the following manner in accordance with JIS Z 0237.

The adhesive sheet 110 which is covered on both sides with separators is examined in the following manner. First, one of the separators is peeled off, and a poly(ethylene terephthalate) (PET) film having a thickness of 50 μm is thereafter adhered to the exposed adhesive surface to line the adhesive sheet 110. Next, a test piece [10 mm (width)×100 mm (length)] is cut out of the lined adhesive sheet 110. Subsequently, the other separator is peeled from this test piece and the test piece is then applied to a stainless-steel plate (SUS304) as an adherend. Thereafter, the test piece is press-bonded to the adherend by rolling a 2-kg roller thereon forward and backward once. This specimen is allowed to stand still for 30 minutes and then examined for 180° peel adhesive force (pulling speed, 300 mm/min; peel temperature, 23° C.) using a peel tester (trade name "Variable-Angle Peel Tester YSP", manufactured by Asahi Seiko Co., Ltd.).

(Methods for Producing the Adhesive Sheet)

The adhesive sheet is produced, for example, in the following manner. First, an adhesive composition (first composition) for first-adhesive-layer formation and an adhesive composition (second composition) for second-adhesive-layer formation are produced. Next, the first composition is applied to the electroconductive surface of a substrate for voltage application and dried, thereby forming a first adhesive layer. Next, the second composition is applied to the reverse-side surface of the substrate for voltage application and dried, thereby forming a second adhesive layer. The adhesive sheet can be produced, for example, in this manner.

Alternatively, the adhesive sheet may be produced by the so-called transfer method. Specifically, a first adhesive layer and a second adhesive layer are first formed on respective separators (release liners). The first adhesive layer is formed by applying the first composition, which is for first-adhesive-layer formation, to the releasing surface of a given separator to form a coating film and then drying the coating film. The second adhesive layer is formed by applying the second composition, which is for second-adhesive-layer formation, to the releasing surface of a given separator to form a coating film and then drying the coating film. Next, the first adhesive layer having the separator adherent thereto is adhered to the electroconductive-layer-side surface of a substrate for voltage application. Subsequently, the second adhesive layer having the separator adherent thereto is adhered to the base-layer-side surface of the substrate for voltage application. The adhesive sheet can be produced, for example, in this manner.

In producing the adhesive sheet 110, a substrate for voltage application 112 which has the same shape as the adhesive sheet 110 being produced (hereinafter referred to also as "desired shape") may be used to produce the adhesive sheet 110 by either of the methods described above. Alternatively, use may be made of a method in which a substrate for voltage application having a shape different from the desired shape is used to produce an adhesive sheet (hereinafter referred to also as "adhesive sheet material") by either of the methods described above and the adhesive sheet material is cut into the desired shape to produce the adhesive sheet 110.

In the case of cutting the adhesive sheet material to produce the adhesive sheet 110, it is preferable that the adhesive sheet 110 has such a shape that a plurality of linked parts 110a extend from a single linking part 110b. It is preferable that the adhesive sheet 110 has such a shape that a plurality of linked parts 110a extend from a single linking part 110b in the same direction, that is, a comb shape such as that shown in FIG. 1. This is because in such cases, the amount of portions of the adhesive sheet material which are to be discarded can be reduced by cutting the adhesive sheet material so that two comb-shaped adhesive sheets 110 are obtained as if these adhesive sheets 110 are mating with each other. Namely, the cost of producing the adhesive sheet 110 can be reduced.

<Joined Body and Electrical Debonding Method for the Joined Body>
(Joined Body)

Next, a joined body obtained using the adhesive sheet 110 according to the first embodiment is explained.

Figure 2:
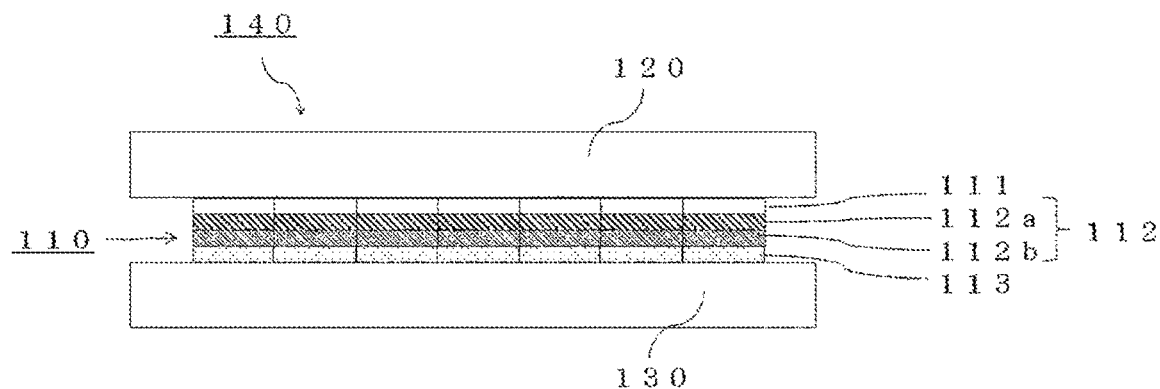
FIG. 2 is views illustrating a joined body according to the first embodiment of the present invention; (a) is a side view and (b) is a slant view.
Figure 2:
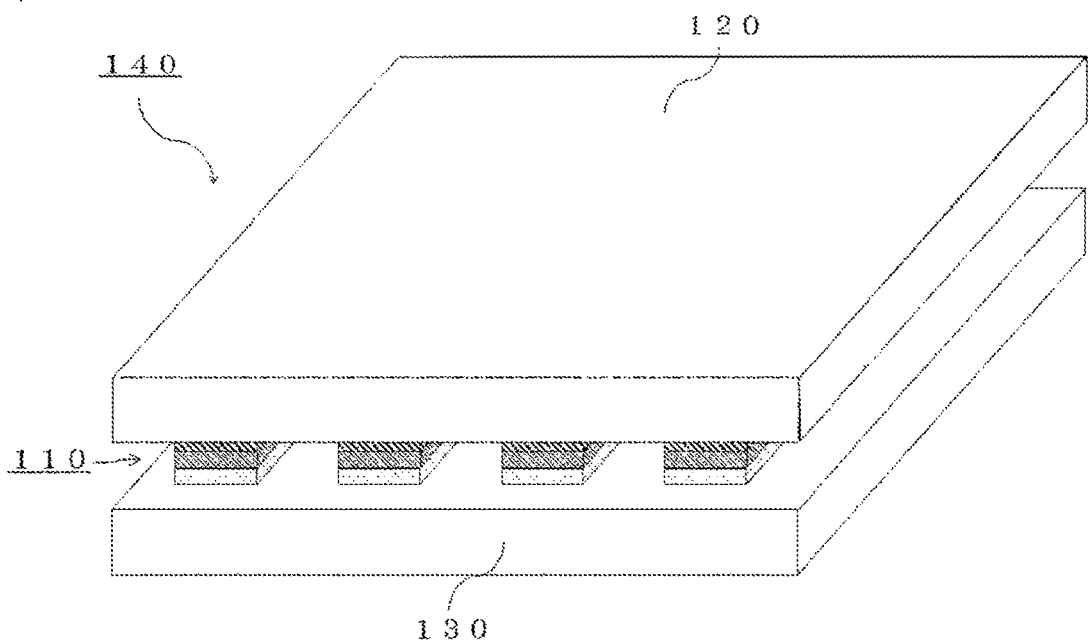
Figure 3:
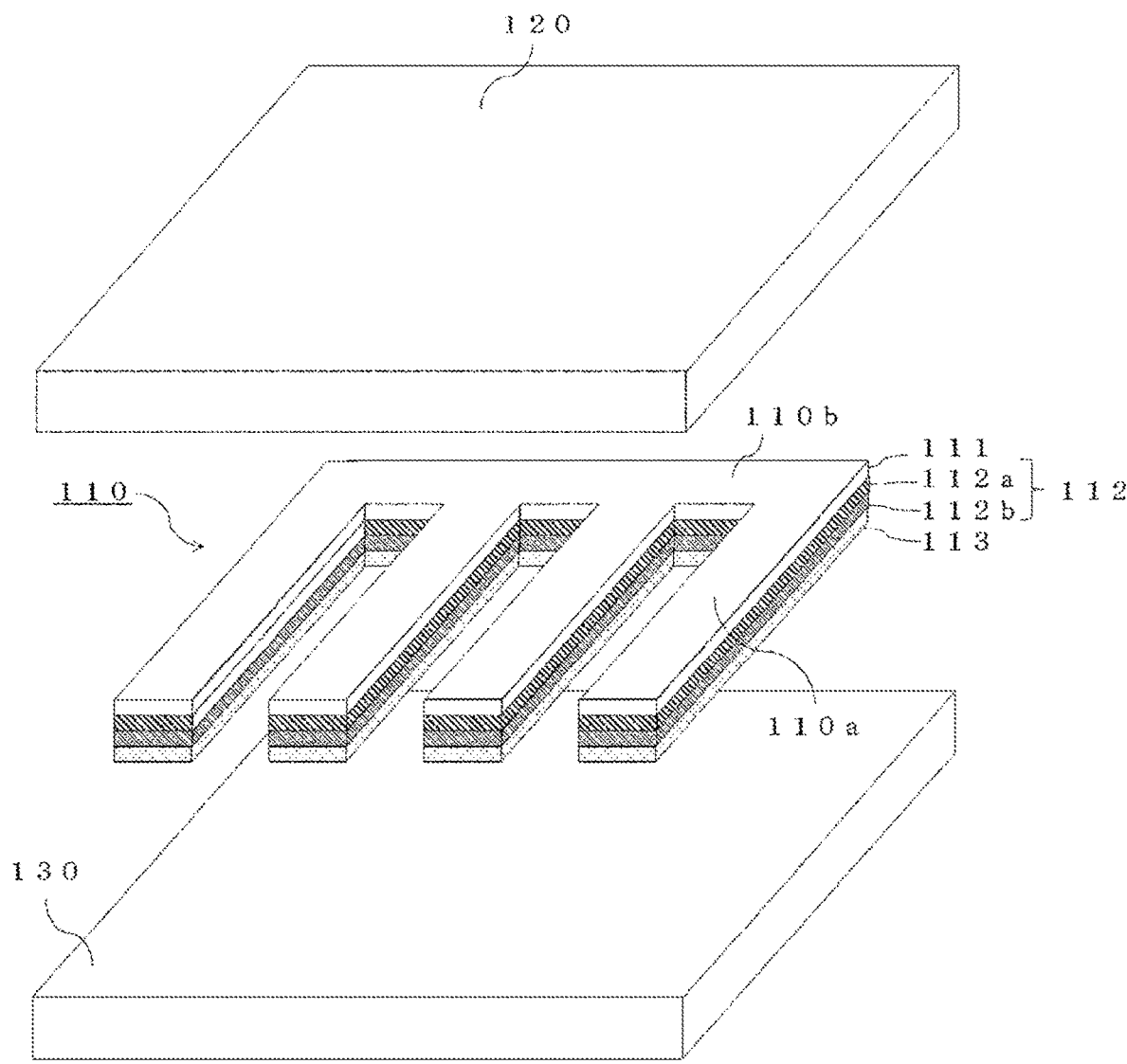
FIG. 3 is an exploded slant view of the joined body according to the first embodiment of the present invention.

FIG. 2(a) is a side view of a joined body 140 according to the first embodiment of the present invention (hereinafter also referred to simply as "joined body 140 according to this embodiment" or "joined body 140"), and FIG. 2(b) is a slant view of the joined body 140 according to this embodiment. FIG. 3 is an exploded slant view of the joined body 140 according this embodiment.

The joined body 140 according to this embodiment is a joined body including the adhesive sheet 110 according to this embodiment, a first adherend 120, which is adhered to the first adhesive layer 111, and a second adherend 130, which is adhered to the second adhesive layer 113, the first adherend 120 being electroconductive.

The first adherend 120 is not particularly limited so long as it has electrical conductivity. Examples of materials constituting such adherends include aluminum, copper, iron, silver, and alloys containing these. The materials may be electroconductive polymers, etc. Electrical conductivity is required of at least portions necessary for producing the effects of the present invention. It is only required in the first adherend 120 that at least the portion which is in contact with the first adhesive layer 111 and a portion with which a terminal of a voltage application device is to be contacted have electrical conductivity and these portions are electrically connected. Meanwhile, the second adherend 130 in this embodiment may have or may not have electrical conductivity.

(Electrical Debonding Method)

In electrically debonding the joined body 140, which has the configuration described above, a voltage is applied to the first adhesive layer 111 of the adhesive sheet 110 via the first adherend 120 and the substrate for voltage application 112. In the adhesive sheet 110 used for joining in the joined body 140 according to this embodiment, the plurality of linked parts 110a are linked to each other by the linking part 110b. It is hence easy to simultaneously apply a voltage to all the linked parts 110a and linking part 110b.

Methods for contacting terminals, in voltage application, with the first adherend 120 and the substrate for voltage application 112 are not particularly limited. However, from the standpoint of operation efficiency, it is preferable that the terminals of a voltage application device are contacted, from the same direction, with the first adherend 120 and the substrate for voltage application 112.

For example, in the case where the terminals are contacted with the first adherend 120 and the substrate for voltage application 112 from the direction of the first adherend, the adhesive sheet 110 may be made to have a portion which protrudes from the first adherend 120 in a plan view of the joined body 140 viewed from the direction of the first adherend 120, in order to facilitate the contact of a terminal of the voltage application device with the substrate for voltage application 112. That portion may include some of the first adhesive layer 111, or may be one which includes none of the first adhesive layer 111 and includes an exposed area of the electroconductive surface of the substrate for voltage application 112. That portion makes it easy to contact a terminal of the voltage application device with the substrate for voltage application 112 from the direction of the first adherend 120. In the case where that portion includes some of the first adhesive layer 111, the terminal is made to pierce the first adhesive layer 111 to come into contact with the substrate for voltage application.

Moreover, the terminal may be made, for example, to pierce the first adherend 120 and the first adhesive layer 111 to come into contact with the substrate for voltage application 112.

In electrically debonding the joined body 140, the voltage to be applied to the first adhesive layer 111 is preferably 1 V or higher, more preferably 3 V or higher, still more preferably 6 V or higher. Meanwhile, the applied voltage is preferably 100 V or less, more preferably 50 V or less, still more preferably 30 V or less, especially preferably 15 V or less. Applied voltages within such a range are suitable because the operation of separating the joined body can be efficiently performed. For example, in cases when the applied voltage is within such a range, an easily available power source such as a dry battery can be used for the voltage application device.

It is preferable that the period of voltage application to the first adhesive layer 111 is short. Specifically, the period of voltage application is preferably 60 seconds or less, more preferably 40 seconds or less, still more preferably 20 seconds or less. Voltage application periods within such a range are suitable for heightening the efficiency of the operation of separating the joined body.

Those preferred ranges of applied voltage and application period apply also in the second to fifth embodiments described below.

Second Embodiment

Figure 4:
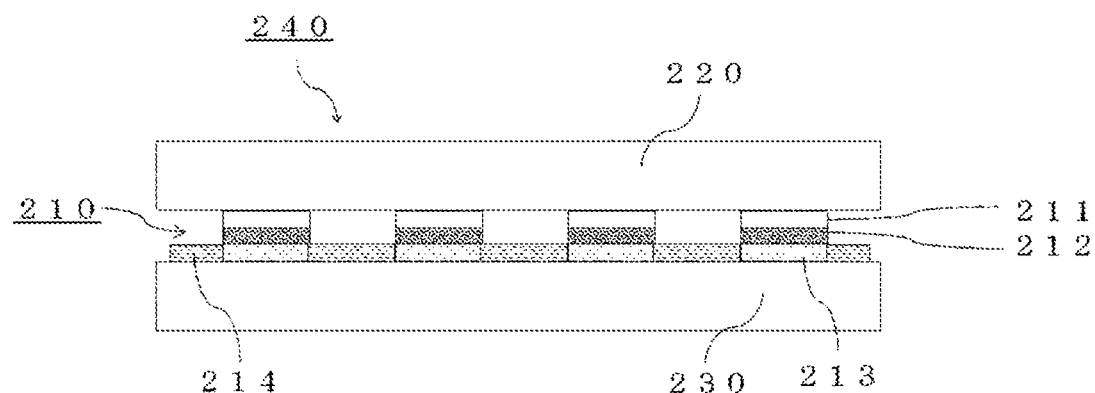
FIG. 4 is views illustrating a joined body according to the second embodiment of the present invention; (a) is a side view and (b) is a slant view.
Figure 4:
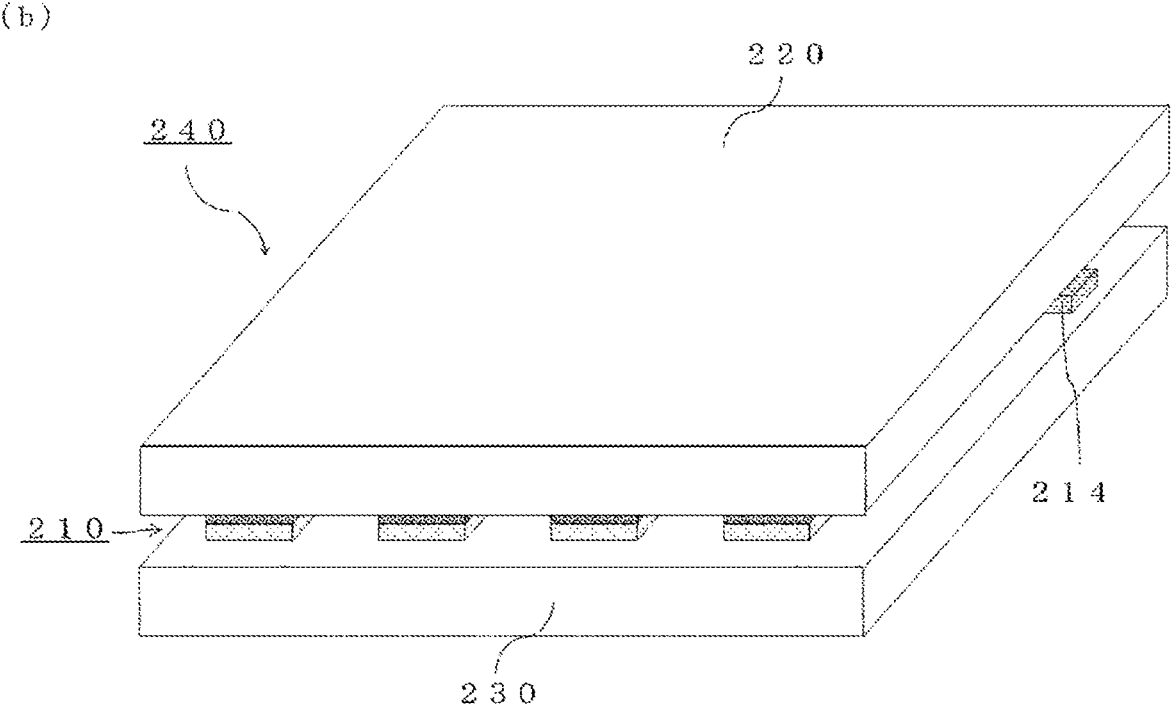
Figure 5:
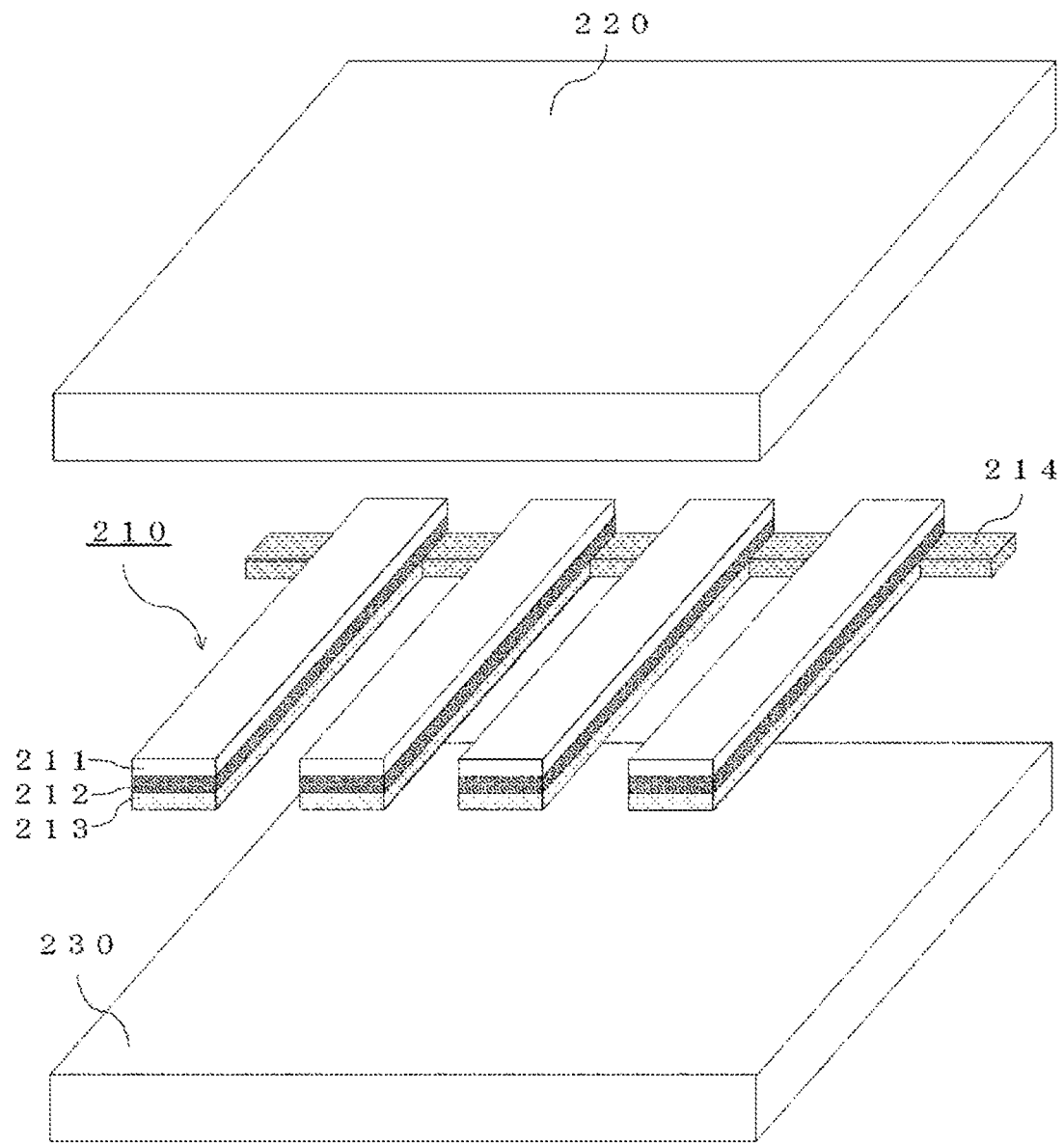
FIG. 5 is an exploded slant view of the joined body according to the second embodiment of the present invention.

FIG. 4(a) is a side view of a joined body 240 according to the second embodiment of the present invention (hereinafter also referred to simply as "joined body 240 according to this embodiment" or "joined body 240"), and FIG. 4(b) is a slant view of the joined body 240 according to this embodiment. FIG. 5 is an exploded slant view of the joined body 240 according to this embodiment.

The joined body 240 according to this embodiment is a joined body including a first adherend 220, a second adherend 230, and a plurality of electrical debonding type adhesive sheets 210 by which the first and second adherends 220 and 230 are joined to each other, wherein the electrical debonding type adhesive sheets 210 each include an electroconductive substrate 212, a first adhesive layer 211, which is constituted of an electrically debondable adhesive and is formed on one surface of the electroconductive substrate 212, and a second adhesive layer 213, which is formed on that surface of the electroconductive substrate 212 which is on the reverse side from the first adhesive layer 211, the first adherend 220 is electroconductive and is adhered to the first adhesive layers 211, the second adherend 230 is adhered to the second adhesive layers 213, and the electroconductive substrates 212 of the plurality of electrical debonding type adhesive sheets 210 are electrically connected to each other by a linking member 214.

<Adhesive Sheets>

First, the electrical debonding type adhesive sheets 210 (hereinafter also referred to simply as "adhesive sheets 210") in the joined body 240 according to this embodiment are explained.

The first adhesive layer 211 and second adhesive layer 213 in each adhesive sheet 210 are the same as the first adhesive layer 111 and second adhesive layer 113 in the first embodiment. These adhesive layers may be protected with separators as in the first embodiment. A preferred range of the adhesive force of the adhesive sheets 210 is the same as that shown above with regard to the first embodiment. For producing the adhesive sheets 210, the same production methods as those explained above with regard to the first embodiment can be used.

The electroconductive substrate 212 in each adhesive sheet 210 may be any substrate having electrical conductivity and is constituted of, for example, a metal or an electroconductive polymer. Specifically, a metal foil or the like can, for example, be used.

<Joined Body>

The joined body 240 is a joined body in which a first adherend 220 and a second adherend 230 are joined to each other by the plurality of adhesive sheets 210.

The first adherend 220 and the second adherend 230 in the joined body 240 according to this embodiment are respectively the same as the adherend 120 and second adherend 130 in the first embodiment.

In the joined body 240 according to this embodiment, the number of the adhesive sheets 210 used for joining the first adherend 220 and the second adherend 230 is not particularly limited so long as it is 2 or larger. The adhesive sheets 210 are not particularly limited in the shape and size thereof, and may differ from each other in size or shape or be equal in size and shape.

As compared with joined bodies each obtained by joining adherends using a plain adhesive sheet, the joined body 240 according to this embodiment, which has the configuration described above, was more inhibited from suffering the trapping of air bubbles during the adhesive-sheet application because the plurality of adhesive sheets 210 each had a small area. Furthermore, this joined body can be formed by disposing the plurality of adhesive sheets 210 so as to avoid surface irregularities and the like of the adherends.

Moreover, this joined body 240 is preferred also from the standpoint of cost reduction since the adhesive sheets 210 used have a small total area, as compared with the joined bodies each obtained by joining adherends using a plain adhesive sheet.

In the joined body 240 according to this embodiment, the linking member 214 is not particularly limited so long as the linking member 214 can electrically connect the electroconductive substrates 212 of the plurality of adhesive sheets 210. It is, however, preferable that each adhesive sheet 210 is made to have a portion where the second adhesive layer 213 does not lie and the linking member 214 is disposed on these portions, as shown in FIG. 5.

The linking member 214 is constituted of, for example, a metal or an electroconductive polymer. Specifically, a metal foil or the like can, for example, be used. The linking member 214 may have a configuration including a single member so that the member electrically connects the electroconductive substrates 212 of all the adhesive sheets 210, or may have a configuration including a plurality of members so that these members electrically connect the electroconductive substrates 212 of all the adhesive sheets 210. It is, however, preferable that the linking member 214 is constituted of a single member, from the standpoint of ease of production.

(Electrical Debonding Method)

In electrically debonding the joined body 240, which has the configuration described above, a voltage is applied to the first adhesive layers 211 of the plurality of adhesive sheets 210 via the first adherend 220 and the electroconductive substrates 212. In the plurality of adhesive sheets 210 used for joining in the joined body 240 according to this embodiment, the electroconductive substrates 212 are electrically connected to each other by the linking member 214. It is hence easy to simultaneously apply a voltage to the first adhesive layers 211 of all the adhesive sheets 210.

From the standpoint of operation efficiency, an especially preferred method for the voltage application is to contact the terminals of a voltage application device from the same direction with the first adherend 220 and with an electroconductive substrate 212 or the linking member 214.

In order to facilitate the contact of a terminal of the voltage application device with an electroconductive substrate 212 or the linking member 214, the adhesive sheet 210 or the linking member 214 may be made to have, for example, a portion which protrudes from the first adherend 220 in a plan view of the joined body 240 viewed from the direction of the first adherend 220, as shown in the first embodiment.

Moreover, the terminal may be made to pierce the first adherend 220 to come into contact with an electroconductive substrate 212 or the linking member 214, as shown in the first embodiment.

Third Embodiment

Figure 6:
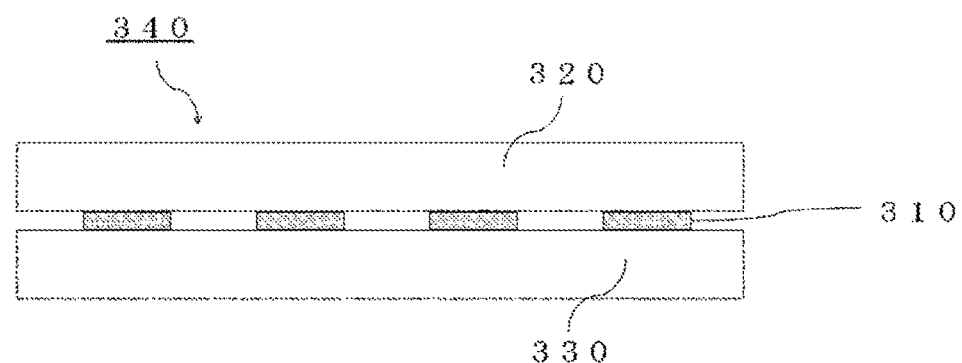
FIG. 6 is views illustrating a joined body according to the third embodiment of the present invention; (a) is a side view and (b) is a slant view.
Figure 6:
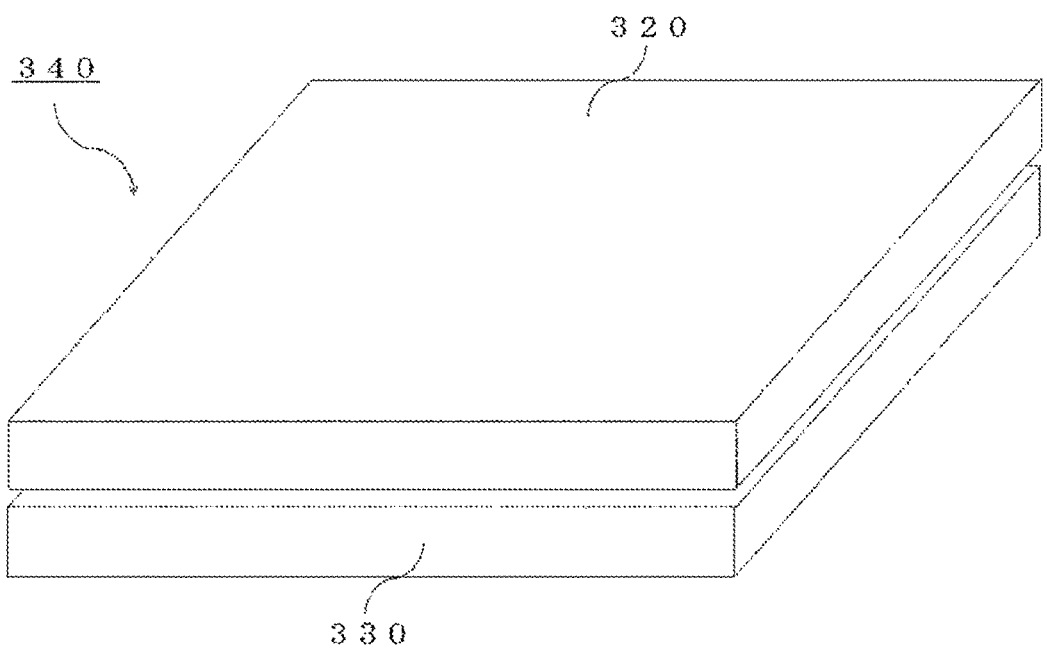
Figure 7:
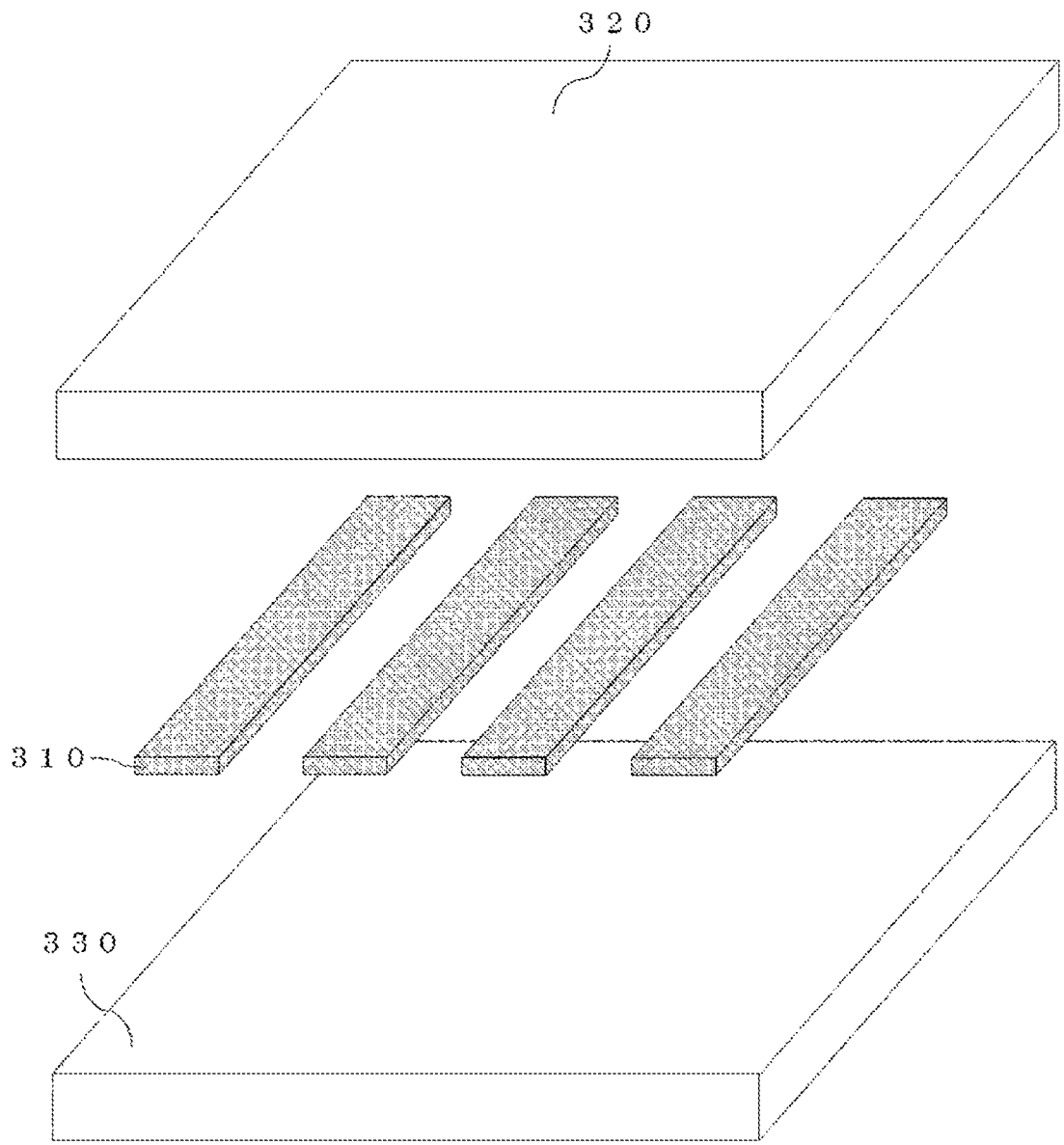
FIG. 7 is an exploded slant view of the joined body according to the third embodiment of the present invention.

FIG. 6(a) is a side view of a joined body 340 according to the third embodiment of the present invention (hereinafter also referred to simply as "joined body 340 according to this embodiment" or "joined body 340"), and FIG. 6(b) is a slant view of the joined body 340 according to this embodiment. FIG. 7 is an exploded slant view of the joined body 340 according to this embodiment.

The joined body 340 according to this embodiment is a joined body including a first adherend 320, a second adherend 330, and a plurality of electrical debonding type adhesive sheets 310 by which the first and second adherends 320 and 330 are joined to each other, wherein the electrical debonding type adhesive sheets 310 include an electrically debondable adhesive, the first adherend 320 is adhered to one surface of each of the electrical debonding type adhesive sheets 310, the second adherend 330 is adhered to that surface of each of the electrical debonding type adhesive sheets 310 which is on the reverse side from the first adherend 320, and the first adherend 320 and the second adherend 330 are electroconductive.

<Adhesive Sheets>

First, the electrical debonding type adhesive sheets 310 (hereinafter also referred to simply as "adhesive sheets 310") in the joined body 340 according to this embodiment are explained.

The adhesive sheets 310 are each an adhesive sheet constituted of an electrically debondable adhesive and do not include a substrate layer or the like. Components of the adhesive sheets 310 and preferred thicknesses, etc. thereof are the same as those of the first adhesive layer 111 in the first embodiment explained above.

Methods for producing the adhesive sheets 310 are not particularly limited. For example, adhesive sheets 310 are formed on a separator (release liner) and another separator is adhered to the surface thereof. Thus, the adhesive sheets 310 protected with separators on both sides can be produced.

Alternatively, the adhesive sheets 310 can be produced by directly applying a composition for adhesive-sheet formation to an adherend.

<Joined Body>

The joined body 340 is a joined body in which a first adherend 320 and a second adherend 330 are joined to each other by the plurality of adhesive sheets 310. In this embodiment, both the first adherend 320 and the second adherend 330 are electroconductive. The first and second adherends 320 and 330 each can be the same as the first adherend 120 in the first embodiment.

In the joined body 340 according to this embodiment, the number of the adhesive sheets 310 used for joining the first adherend 320 and the second adherend 330 is not particularly limited so long as it is 2 or larger. Effects produced by forming the joined body using the plurality of adhesive sheets 310 are the same as the effects explained above with regard to the second embodiment.

The adhesive sheets 310 in the joined body 340 according to the third embodiment have a single-layer structure including no substrate and are hence extremely thin. Consequently, the adhesive sheets 310 are highly excellent from the standpoint of reducing the size of the joined body 340 according to the third embodiment.

(Electrical Debonding Method)

In electrically debonding the joined body 340, which has the configuration described above, a voltage is applied to the plurality of adhesive sheets 310 via the first adherend 320 and the second adherend 330.

From the standpoint of operation efficiency, an especially preferred method for the voltage application is to contact the terminals of a voltage application device from the same direction with the first adherend 320 and the second adherend 330.

For example, in the case where the terminals are contacted with the two adherends from the direction of the first adherend, the second adherend 330 may be configured so as to have a portion which protrudes from the first adherend 320 in a plan view of the joined body 340 viewed from the direction of the first adherend 320, or may be configured so as to be larger than the first adherend 320, in order to facilitate a contact with the second adherend 340.

Moreover, the terminal may be made to pierce the first adherend 320 to come into contact with the second adherend 330 as shown in the first embodiment. In this case, the terminal may further pierce an adhesive sheet 310 to come into contact with the second adherend 330.

Fourth Embodiment

Figure 8:
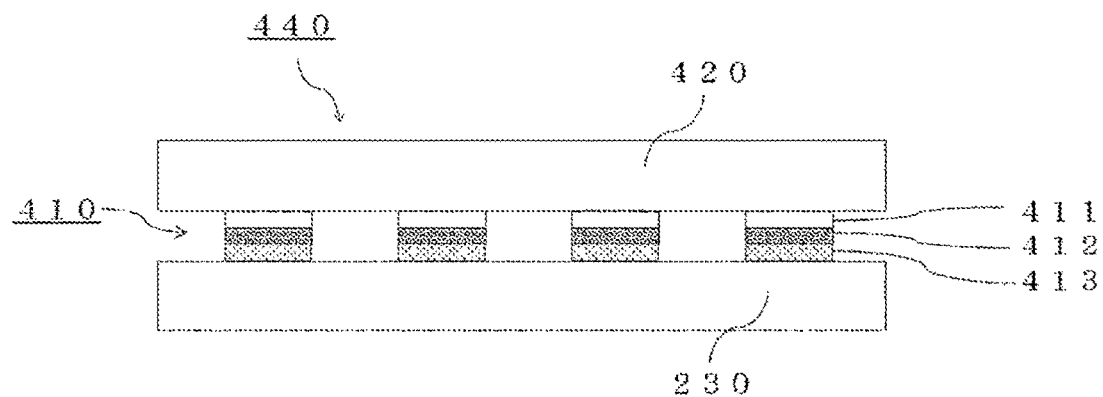
FIG. 8 is views illustrating a joined body according to the fourth embodiment of the present invention; (a) is a side view and (b) is a slant view.
Figure 8:
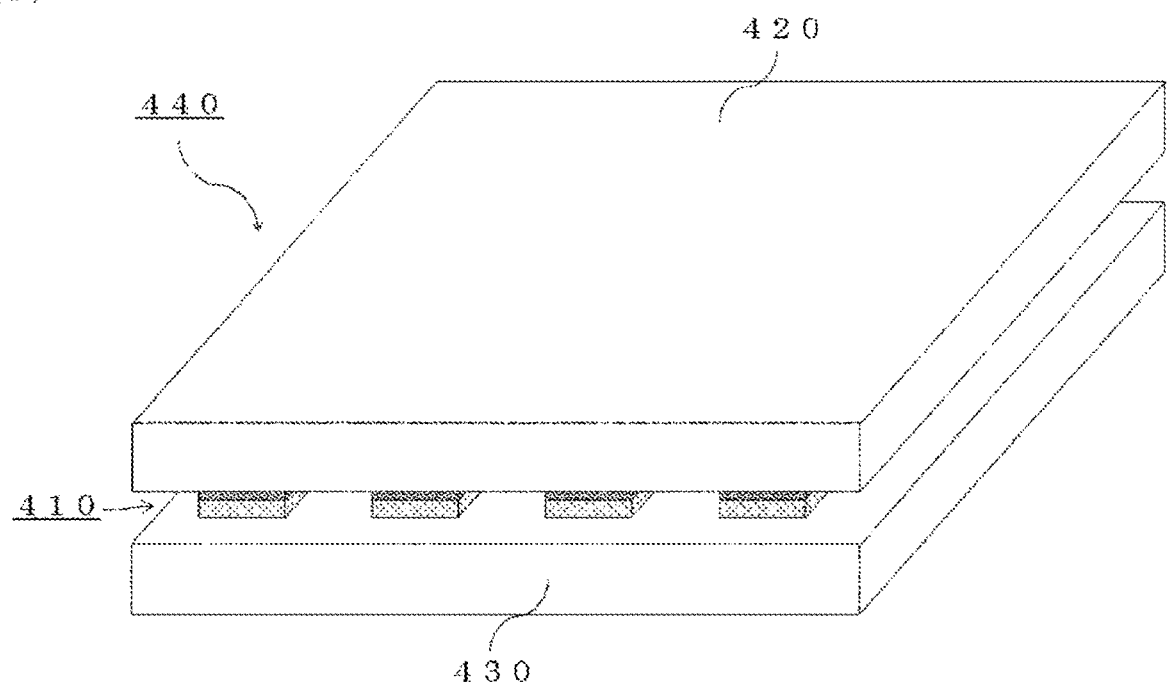
Figure 9:
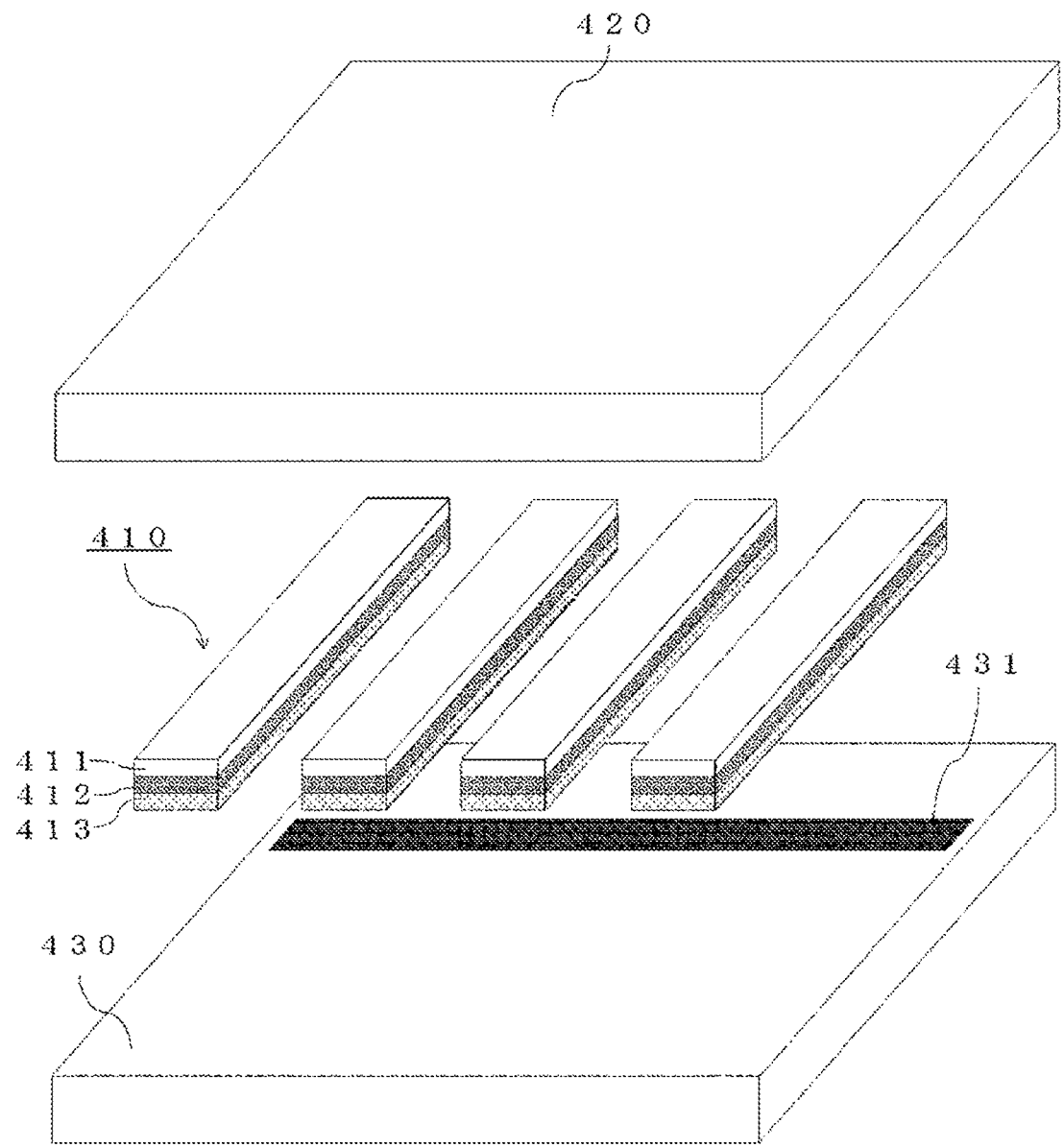
FIG. 9 is an exploded slant view of the joined body according to the fourth embodiment of the present invention.

FIG. 8(a) is a side view of a joined body 440 according to the fourth embodiment of the present invention (hereinafter also referred to simply as "joined body 440 according to this embodiment" or "joined body 440"), and FIG. 8(b) is a slant view of the joined body 440 according to this embodiment. FIG. 9 is an exploded slant view of the joined body 440 according to this embodiment.

The joined body 440 according to this embodiment is a joined body including a first adherend 420, a second adherend 430, and a plurality of electrical debonding type adhesive sheets 410 by which the first and second adherends 420 and 430 are joined to each other, wherein the adhesive sheets 410 each include an electroconductive substrate 412, a first adhesive layer 411, which is constituted of an electrically debondable adhesive and is formed on the electroconductive substrate 412, and a second adhesive layer 413, which is constituted of an electroconductive adhesive and is formed on that surface of the electroconductive substrate which is on the reverse side from the first adhesive layer 411, the first adhesive layers 411 of the plurality of adhesive sheets 410 each are adhered to the first adherend 420, and the second adhesive layers 413 each are adhered to the second adherend 430, the first adherend 420 is electroconductive, the second adherend 430 includes an electroconductive portion 431 having electrical conductivity, and the second adhesive layers 413 of the plurality of adhesive sheets 410 are electrically connected to each other by the electroconductive portion 431.

<Adhesive Sheets>

First, the electrical debonding type adhesive sheets 410 (hereinafter also referred to simply as "adhesive sheets 410") in the joined body 440 according to this embodiment are explained.

The first adhesive layers 411 in the adhesive sheets 410 each can be the same as the first adhesive layer 111 in the first embodiment.

The electroconductive substrates 412 can be the same as the electroconductive substrates 212 in the second embodiment.

The second adhesive layers 413 are layers constituted of an electroconductive adhesive. The electroconductive adhesive constituting the second adhesive layers is not particularly limited, and known ones can be used. For example, use can be made of an adhesive (e.g., an acrylic adhesive) containing an electroconductive ingredient (e.g., a silver filler) in an amount of about 3-70% by weight.

The first adhesive layers 411 and the second adhesive layers 413 may be protected with separators as in the first embodiment. A preferred range of the adhesive force of the adhesive sheets 410 is the same as that shown above with regard to the first embodiment. For producing the adhesive sheets 410, the same production methods as those explained above with regard to the first embodiment can be used.

<Joined Body>

The joined body 440 is a joined body in which a first adherend 420 and a second adherend 430 are joined to each other by the plurality of adhesive sheets 410.

The first adherend 420 in the joined body 440 according to this embodiment is the same as the adherend 120 in the first embodiment.

The second adherend 430 includes an electroconductive portion 431 having electrical conductivity. The electroconductive portion 431 is not particularly limited so long as the second adhesive layers 413 of the plurality of adhesive sheets 410 are electrically connected to each other by the electroconductive portion.

An electroconductive portion may be formed over the whole of that surface of the second adherend 430 on which the adhesive sheets 410 are adhered, or one or more electroconductive portions may be partly formed on that surface. In the case where one or more electroconductive portions are partly formed, the second adherend 430 may have a configuration in which the second adhesive layers 413 of all the adhesive sheets 410 are electrically connected by a single electroconductive portion 431 as shown in FIG. 9, or may have a configuration in which the second adhesive layers 413 of all the adhesive sheets 410 are electrically connected by a plurality of electroconductive portions 431.

Methods for forming the electroconductive portion 431 are not particularly limited. For example, in the case where the second adherend 430 is a member obtained by forming an insulating coating on an electroconductive material, e.g., a metal, an electroconductive portion 431 can be formed by scraping off some of the insulating coating to expose the electroconductive material.

Alternatively, an electroconductive portion 431 may be formed on a second adherend 430 constituted of an insulating material, by forming a coating of an electroconductive material, e.g., a metal, on a surface of the second adherend 430.

In the joined body 440 according to this embodiment, the number of the adhesive sheets 410 used for joining the first adherend 420 and the second adherend 430 is not particularly limited so long as it is 2 or larger. Effects produced by forming the joined body using the plurality of adhesive sheets 410 are the same as the effects explained above with regard to the second embodiment.

(Electrical Debonding Method)

In electrically debonding the joined body 440, which has the configuration described above, a voltage is applied to the first adhesive layers 411 of the plurality of adhesive sheets 410 via the first adherend 420 and the electroconductive substrates 412. In the plurality of adhesive sheets 410 used for joining in the joined body 440 according to this embodiment, the electroconductive substrates 412 are electrically connected to each other by the second adhesive layers 413 and the electroconductive portion 431. It is hence easy to simultaneously apply a voltage to the first adhesive layers 411 of all the adhesive sheets 410.

From the standpoint of operation efficiency, an especially preferred method for the voltage application is to contact the terminals of a voltage application device from the same direction with the first adherend 420 and with an electroconductive substrate 412 or the electroconductive portion 431.

In order to facilitate the contact of a terminal of the voltage application device with an electroconductive substrate 412 or the electroconductive portion 431, the adhesive sheet 410 or the electroconductive portion 431 may be made to have, for example, a portion which protrudes from the first adherend 420 in a plan view of the joined body 440 viewed from the direction of the first adherend 420, as shown in the first embodiment.

Moreover, the terminal may be made to pierce the first adherend 420 to come into contact with an electroconductive substrate 412 or the electroconductive portion 431, as shown in the first embodiment.

Fifth Embodiment

Figure 10:
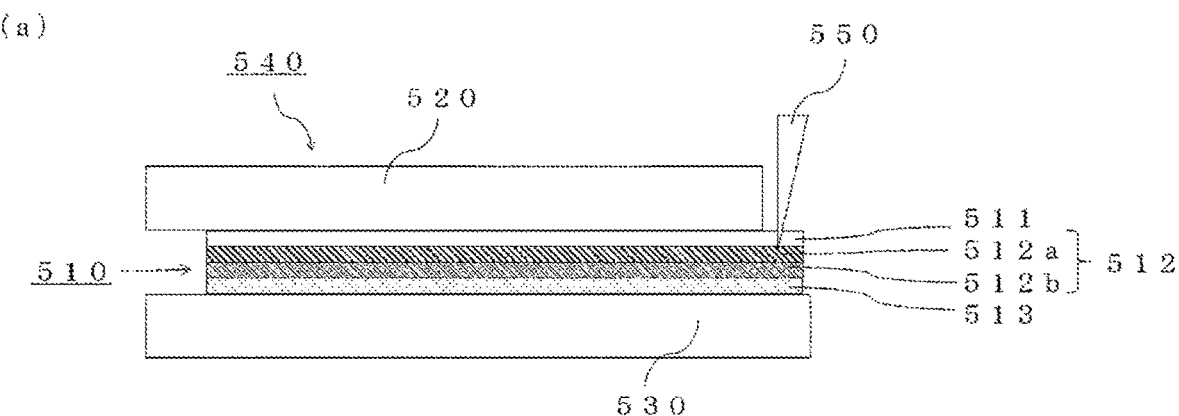
FIG. 10 is views illustrating a joined-body debonding method according to the fifth embodiment of the present invention; (a) is a side view and (b) is a top view.
Figure 10:
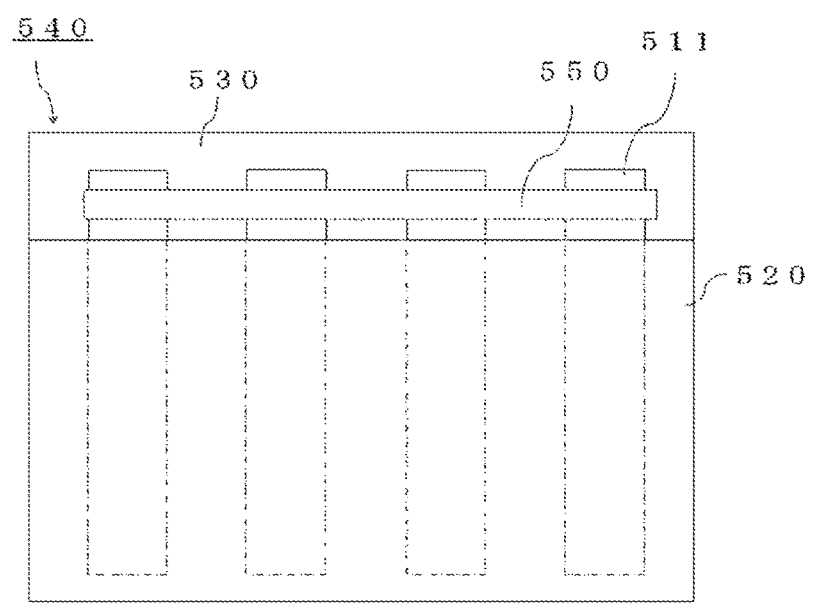
Figure 11:
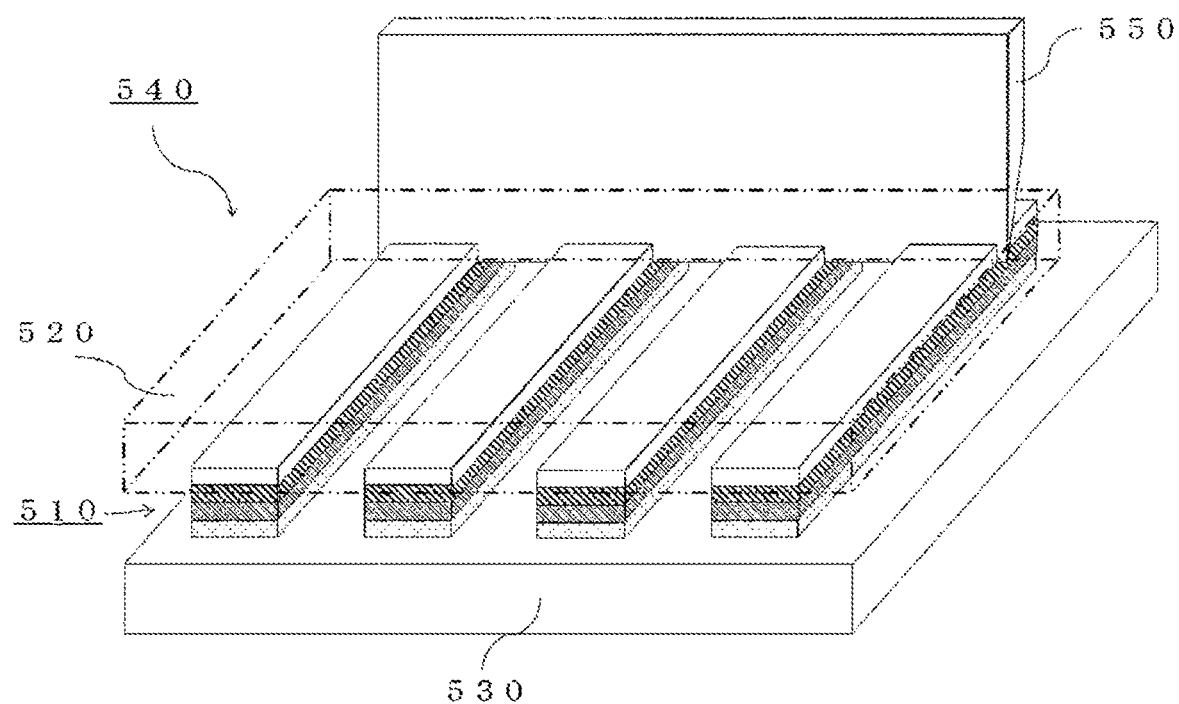
FIG. 11 is a slant view illustrating a joined-body debonding method according to the fifth embodiment of the present invention.

FIG. 10(*a*) is a side view roughly illustrating a joined-body debonding method according to the fifth embodiment of the present invention (hereinafter also referred to simply as "debonding method according to this embodiment"), and FIG. 10(*b*) is a plan view roughly illustrating the debonding method according to this embodiment. FIG. 11 is a slant view roughly illustrating the debonding method according to this embodiment.

The debonding method according to this embodiment is a debonding method for a joined body 550 including a first adherend 520, a second adherend 530, and a plurality of electrical debonding type adhesive sheets 510 by which the first and second adherends 520 and 530 are joined to each other, wherein the electrical debonding type adhesive sheets 510 each include a substrate for voltage application 512 in which at least one surface has electrical conductivity, a first adhesive layer 511, which is constituted of an electrically debondable adhesive and is formed on the electroconductive surface of the substrate for voltage application, and a second adhesive layer 513, which is formed on that surface of the substrate for voltage application which is on the reverse side from the first adhesive layer, the first adherend 520 is electroconductive and is adhered to the first adhesive layers 511, and the second adherend 530 is adhered to the second adhesive layers 513, the debonding method including electrically connecting the substrates for voltage application 512 of the plurality of electrical debonding type adhesive sheets 510 by a jig 550 and debonding the first adherend 520 and the second adherend 530 while simultaneously applying a voltage to the first adhesive layers 511 of the plurality of electrical debonding type adhesive sheets 510.

<Adhesive Sheets>

First, the electrical debonding type adhesive sheets 510 (hereinafter also referred to simply as "adhesive sheets 510") used to form the joined body 540, which is debonded in the debonding method according to this embodiment, is explained.

The first adhesive layer 511, substrate for voltage application 512, and second adhesive layer 513 in each of the adhesive sheets 510 can be the same as the first adhesive layer 111, substrate for voltage application 112, and second adhesive layer 113 in the first embodiment. These adhesive layers may be protected with separators as in the first embodiment. A preferred range of the adhesive force of the adhesive sheets 510 is the same as that shown above with regard to the first embodiment. For producing the adhesive sheets 510, the same production methods as those explained above with regard to the first embodiment can be used.

<Joined Body>

The joined body 540 to be debonded in the debonding method according to this embodiment is a joined body in which a first adherend 520 and a second adherend 530 are joined to each other by the plurality of adhesive sheets 510.

The first adherend 520 and the second adherend 530 in the joined body 540 can be respectively the same as the adherend 120 and second adherend 130 in the first embodiment.

In the joined body 540, the number of the adhesive sheets 510 used for joining the first adherend 520 and the second adherend 530 is not particularly limited so long as it is 2 or larger. The adhesive sheets 510 are not particularly limited in the shape and size thereof. Effects produced by forming the joined body using the plurality of adhesive sheets 510 are the same as the effects explained above with regard to the second embodiment.

(Electrical Debonding Method)

In the electrical debonding method according to this embodiment, a voltage is applied to the first adhesive layers of the plurality of adhesive sheets 510 via the first adherend 520 and the substrates for voltage application 512. In preparation for the voltage application, the substrates for voltage application 512 of the plurality of electrical debonding type adhesive sheets 510 are electrically connected to each other by a jig 550. Then, a voltage is simultaneously applied to the first adhesive layers 511 of the plurality of electrical debonding type adhesive sheets 510.

The jig 550 is not particularly limited in the shape or material thereof so long as the jig 550 can electrically connect all the plurality of electrical debonding type adhesive sheets 510 to each other. An example of the jig 550 is a blade-shaped jig, such as that shown in FIG. 10, which can penetrate the first adhesive layers of the adhesive sheets 510 to come into contact with the substrates for voltage application 512.

In order to facilitate the contact of the jig with the substrates for voltage application 512, the joined body 540 may be configured so that the substrates for voltage application 512 protrude from the first adherend 520 in a plan view of the joined body 540 viewed from the direction of the first adherend 520, as shown, for example, in FIG. 10.

Alternatively, a gap for jig insertion may be formed in the first adherend 520 to contact the jig 550 with the substrates for voltage application 512 through the gap.

While the invention has been described in detail and with reference to specific embodiments thereof, it will be apparent to one skilled in the art that various changes and modifications can be made therein without departing from the spirit and scope thereof. This application is based on a Japanese patent application filed on Mar. 8, 2018 (Application No. 2018-42244), the entire contents thereof being incorporated herein by reference. All the references cited here are incorporated herein as a whole.

REFERENCE SIGNS LIST 110, 210, 310, 410, 510: Electrical debonding type adhesive sheet
  110a: Linked part
  110b: Linking part
111, 211, 411, 511: First adhesive layer
112, 512: Substrate for voltage application
  112a, 512a: Electroconductive layer
  112b, 512b: Base layer
212, 412: Electroconductive substrate
113, 213, 413, 513: Second adhesive layer
214: Linking member
120, 220, 320, 420, 520: First adherend
130, 230, 330, 430, 530: Second adherend
431: Electroconductive portion
140, 240, 340, 440, 540: Joined body
550: Jig

The invention claimed is:

1. An electrical debonding type adhesive sheet, comprising:
  a substrate for voltage application in which at least one surface has electrical conductivity,
  a first adhesive layer, which is constituted of an electrically debondable adhesive and is formed on the electroconductive surface of the substrate for voltage application, and
  a second adhesive layer, which is formed on a surface of the substrate for voltage application which is on the reverse side from the first adhesive layer,
  a plurality of linked parts, and
  a linking part which links the plurality of linked parts to each other,
wherein
  the linking part is a blade-shaped jig penetrating the first adhesive layer and in electrical contact with the substrate for voltage application, and
  the substrate for voltage application comprises a base layer and an electrically conductive layer formed by at least one of electro-plating, chemical vapor deposition or sputtering on the base layer.

2. The electrical debonding type adhesive sheet according to claim 1, which has a comb shape.

3. A joined body comprising the electrical debonding type adhesive sheet according to claim 1, a first adherend, which is adhered to the first adhesive layer, and a second adherend, which is adhered to the second adhesive layer,
  wherein the first adherend is electroconductive.

4. The electrical debonding type adhesive sheet according to claim 1, wherein the blade-shaped jig does not pierce through an entirety of the electrical debonding type adhesive sheet.

5. The electrical debonding type adhesive sheet according to claim 1, wherein the plurality of linked parts are physically separated from one another and the blade-shaped jig is in direct physical contact with each of the plurality of linked parts.

6. The electrical debonding type adhesive sheet according to claim 1, wherein the blade-shaped jig has a blade-side extending across a length of the blade-shaped jig, and the blade-side of the blade-shaped jig is in direct physical contact with each of the plurality of linked parts.

7. A joined body, comprising:
  a first adherend,
  a second adherend, and
  a plurality of electrical debonding type adhesive sheets by which the first and second adherends are joined to each other,
wherein
  the electrical debonding type adhesive sheets each comprise:
    an electroconductive substrate,
    a first adhesive layer, which is constituted of an electrically debondable adhesive and is formed on one surface of the electroconductive substrate, and
    a second adhesive layer, which is formed on that surface of the electroconductive substrate which is on the reverse side from the first adhesive layer,
  the first adherend is electroconductive and is adhered to the first adhesive layers,
  the second adherend is adhered to the second adhesive layers, the electroconductive substrates of the plurality of electrical debonding type adhesive sheets are electrically connected to each other by a linking member, the linking member is a blade-shaped jig penetrating the first adhesive layer and in electrical contact with the electroconductive substrates, and the electroconductive substrates of the plurality of electrical debonding type adhesive sheets comprise a base layer and an electrically conductive layer formed by at least one of electro-plating, chemical vapor deposition or sputtering on the base layer.

8. The electrical debonding type adhesive sheet according to claim 7, wherein the blade-shaped jig does not pierce through an entirety of the electrical debonding type adhesive sheet.

9. A debonding method for a joined body including a first adherend, a second adherend, and a plurality of electrical debonding type adhesive sheets by which the first and second adherends are joined to each other, wherein the electrical debonding type adhesive sheets each comprise a substrate for voltage application in which at least one surface has electrical conductivity, a first adhesive layer, which is constituted of an electrically debondable adhesive and is formed on the electroconductive surface of the substrate for voltage application, and a second adhesive layer, which is formed on a surface of the substrate for voltage application which is on the reverse side from the first adhesive layer, the first adherend is electroconductive and is adhered to the first adhesive layers, the second adherend is adhered to the second adhesive layers, the substrate for voltage application comprises a base layer and an electrically conductive layer formed by at least one of electro-plating, chemical vapor deposition or sputtering on the base layer, and the debonding method comprises:

electrically connecting the substrates for voltage application of the plurality of electrical debonding type adhesive sheets by penetrating the first adhesive layer with a blade-shaped jig such that the blade-shaped jig is in electrical contact with the substrates for voltage application, and debonding the first adherend and the second adherend while simultaneously applying a voltage to the first adhesive layers of the plurality of electrical debonding type adhesive sheets.

10. The debonding method according to claim 9, wherein the blade-shaped jig does not pierce through an entirety of the electrical debonding type adhesive sheets.

* * * * *